US012720016B2

(12) United States Patent
Jain et al.

(10) Patent No.: US 12,720,016 B2
(45) Date of Patent: Aug. 25, 2026

(54) STORAGE SOFT-RECYCLING IN VIDEO RECORDING SYSTEM

(71) Applicant: Honeywell International Inc., Charlotte, NC (US)

(72) Inventors: Abhishek Jain, Atlanta, GA (US); Amit Kumar Grewal, Bhiwani (IN); Ganesh Ramesh Hegde, Atlanta, GA (US); Giri Guntipalli, Johns Creek, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/038,138

(22) Filed: Jan. 27, 2025

(65) Prior Publication Data

US 2026/0222521 A1 Jul. 30, 2026

(51) Int. Cl.
*H04N 7/18* (2006.01)
*G06V 20/40* (2022.01)
*G06V 20/52* (2022.01)

(52) U.S. Cl.
CPC ............. *H04N 7/181* (2013.01); *G06V 20/49* (2022.01); *G06V 20/52* (2022.01)

(58) Field of Classification Search
CPC ......... H04N 7/181; G06V 20/52; G06V 20/49
See application file for complete search history.

(56) References Cited

U.S. PATENT DOCUMENTS 8,350,907 B1 * 1/2013 Blanco ............... H04N 21/4335 348/143
10,152,492 B1 12/2018 Abdulla
11,917,282 B2 2/2024 Xiong et al.
2004/0068605 A1 4/2004 Hirasawa
2012/0226781 A1 * 9/2012 Tsai ...................... H04L 65/765 709/219
2022/0043583 A1 * 2/2022 Francisco ............. G06F 3/0685
2023/0306109 A1 * 9/2023 Lowenhardt .......... G06F 21/577

FOREIGN PATENT DOCUMENTS

CN 102541970 A 7/2012

OTHER PUBLICATIONS

"Copilot Query", Oct. 8, 2024, 1 page.

(Continued)

*Primary Examiner* — Sunghyoun Park
(74) *Attorney, Agent, or Firm* — Seager, Tufte & Wickhem, LLP

(57) ABSTRACT

A video recording system and method for archiving surveillance videos from multiple cameras includes storing video clips in files on a storage medium. The system segments incoming videos into time-ordered clips and stores them in a hierarchical directory structure organized by camera and time period. When storage capacity reaches a threshold, the system identifies older video clips based on age or retention policies, designates their files as recycled files, and moves the recycled files to a recycle directory. As new video clips are captured, they are stored in the recycled files rather than deleting the old files and creating new files. The system supports different retention periods for different cameras.

20 Claims, 4 Drawing Sheets

(56) References Cited

OTHER PUBLICATIONS

Stonefly, “Surveillance Video Archive: Enterprise Requirements & StoneFly Archiving Solutions”, available online at: <https://stonefly.com/blog/surveillance-video-archive-enterprise-requirements-stonefly-archiving-solutions/#:~: text=Surveillance%20Video%20Archive%3A%20Enterprise%20Requirements%20%26%20StoneFly%20Archiving%20Solutions, %2C%20one%20year%20or%20more).>, 2024, 10 pages.

Wang Chong et al: “LVFS: A Lightweight Video Storage File System for IP Camera-Based Surveillance Applications”, Jan. 13, 2018 (Jan. 13, 2018), Sat 2015 18th International Conference, Austin, TX, USA, Sep. 24-27, 2015; [Lecture Notes in Computer Science; Lect.Notes Computer] Springer, Berlin, Heidelberg, pp. 189-199 (11 pages).

* cited by examiner

STORAGE SOFT-RECYCLING IN VIDEO RECORDING SYSTEM

TECHNICAL FIELD

The present disclosure relates generally to recording video in video surveillance systems, and more particularly to soft-recycling recorded video in a video surveillance system.

BACKGROUND

A typical video surveillance system includes many video cameras. Recorders (e.g. Digital Video Recorders, Network Video Recorders, etc.) are often used to archive data from the video cameras (video, audio and/or metadata) for future analysis, evidence, and forensic purposes. The recorders typically include a fixed amount of storage space, such as a fixed number of hard drives. Typically, the recorders keep writing the data from the video cameras to the hard disks in a series of recording data files. Once the hard drives become "full", older recording data files are typically deleted from the hard drives to make room for the latest recording data files, often in a First-In-First-Out (FIFO) manner. Existing recording system typically employ file deletion logic that identifies and remove the older recording data files from the hard disk to make room for the latest recording data files. This file deletion logic often consumes substantial time, disk usage and other system resources. What would be desirable are systems and methods for automatically performing soft recycling of recording data files in order to reduce overall system resources, increase system performance and reduce equipment wear.

SUMMARY

The present disclosure relates generally to recording video in video surveillance systems, and more particularly to soft-recycling recorded video in a video surveillance system. An example may be found in a video recording system for archiving a plurality of videos each captured by a corresponding one of a plurality of video cameras of a video surveillance system. The video recording system includes an input for receiving the plurality of videos, a storage medium for storing files in accordance with a file system, and a controller that is operatively coupled to the input and the storage medium. The controller is configured to segment each of the plurality of videos received via the input into a plurality of video clips that each correspond to a respective time segment, resulting in a plurality of time ordered video clips for each of the plurality of video cameras including a newest video clip and an oldest video clip. The controller is configured to store each of the plurality of video clips in a corresponding video file on the storage medium. The controller is configured to determine when the storage medium reaches a threshold usage capacity. When the storage medium reaches the threshold usage capacity, the controller is configured to identify one or more video files stored in the file system of the storage medium that represent one or more older video clips, and designate (and not delete) the identified one or more video files that represent the one or more older video clips as recycled video files in the file system of the storage medium. As subsequent video clips are segmented and added as the newest video clips, the controller is configured to store each of the plurality of newest video clips into a selected one of the recycled video files in the file system of the storage medium.

Another example may be found in a method for storing a plurality of videos each captured by a corresponding one of a plurality of video cameras of a video surveillance system. The method includes storing a plurality of video clips each in a respective video file on a non-volatile storage medium, wherein each of the video clips includes video captured by one of the plurality of video cameras during a corresponding period of time such that each of the plurality of video cameras has a plurality of time ordered video clips including a newest video clip and an oldest video clip each stored in a corresponding video file. The method includes identifying one or more video files stored on the non-volatile storage medium that represent one or more older video clips, and designating the identified one or more video files that represent the one or more older video clips as recycled video files. As subsequent video clips are added as the newest video clips, each of the plurality of newest video clips are stored in a selected one of the recycled video files rather than creating a new file on the non-volatile storage medium for storing each of the newest video clips.

Another example may be found in a non-transitory computer readable medium storing instructions. When the instructions are executed by one or more processors, the one or more processors are caused to store a plurality of video clips each in a respective video file on a non-volatile storage medium, wherein each of the video clips includes video captured by one of a plurality of video cameras during a corresponding period of time such that each of the plurality of video cameras has a plurality of time ordered video clips including a newest video clip and an oldest video clip each stored in a corresponding video file. The one or more processors are caused to identify one or more video files stored on the non-volatile storage medium that represent one or more older video clips, and designate the identified one or more video files that represent the one or more older video clips as recycled video files. As subsequent video clips are added as newest video clips, the one or more processors are caused to store each of the plurality of newest video clips into a selected one of the existing recycled video files rather than creating new video files for storing each of the newest video clips.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
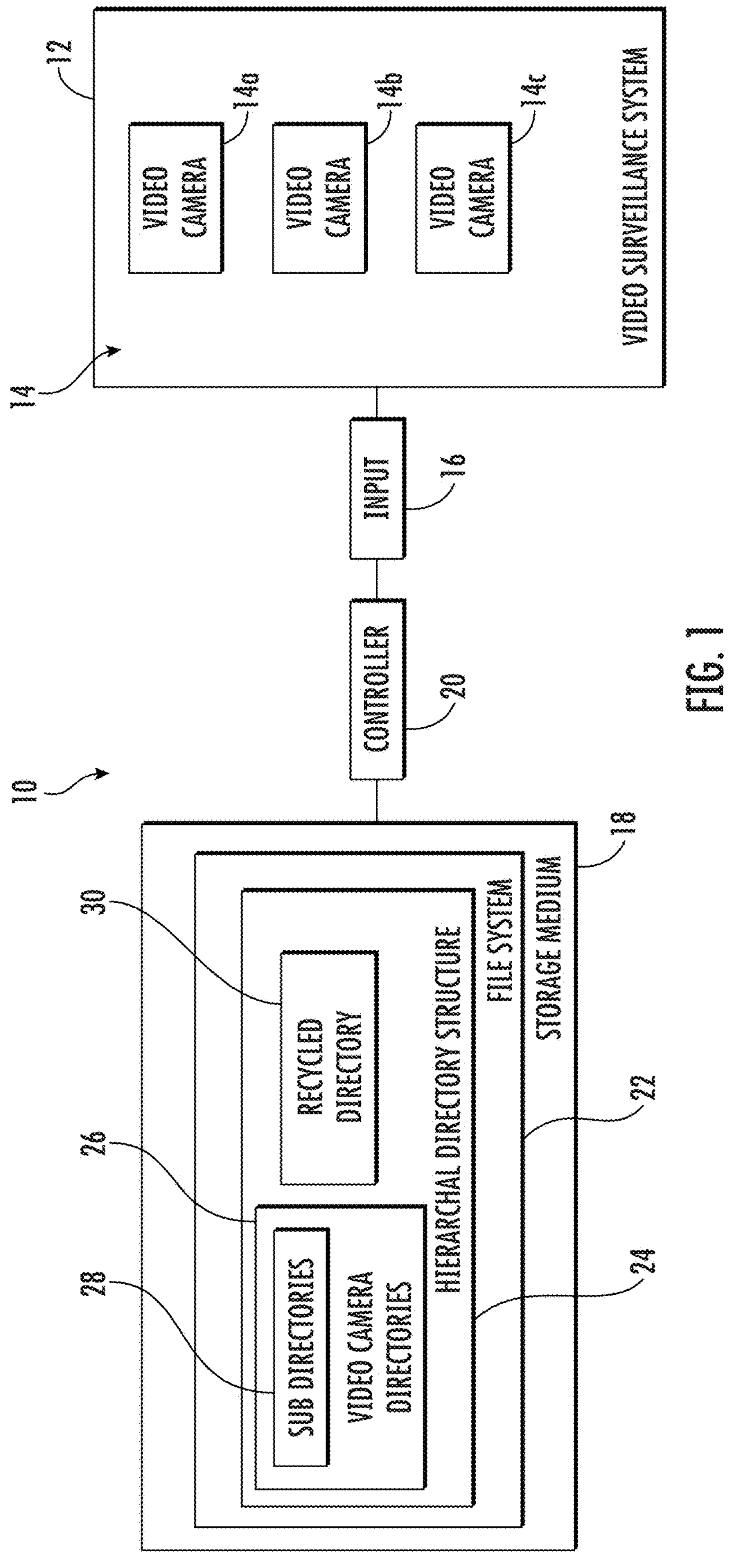
FIG. 1 is a schematic block diagram showing an illustrative video recording system in conjunction with a video surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term “about”, unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms “a”, “an”, and “the” include the plural referents unless the content clearly dictates otherwise. As used in this specification and the appended claims, the term “or” is generally employed in its sense including “and/or” unless the content clearly dictates otherwise.

It is noted that references in the specification to “an embodiment”, “some embodiments”, “other embodiments”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative video recording system 10. The illustrative video recording system 10 may be used for recording video streams that are generated by a video surveillance system 12. The video surveillance system 12 includes a number of video cameras 14, individually labeled as 14*a*, 14*b*, and 14*c*, that each produce video streams. While a total of three video cameras 14 are shown, it will be appreciated that the video surveillance system 12 may include any number of video cameras 14 and in some cases may include considerably more than three video cameras 14.

The video recording system 10 includes an input 16 for receiving videos and/or video streams from each of the video cameras 14 of the video surveillance system 12. The video recording system 10 includes a storage medium 18 and a controller 20 that is operatively coupled to the input 16 and to the storage medium 18. The storage medium 18 may be non-volatile and may be considered as including a file system 22. In some cases, the file system 22 may include a hierarchical directory structure 24. In some cases, the hierarchical directory structure 24 may include video camera directories 26 and a recycled directory 30. In some cases, the video camera directories 26, which may include a particular video camera directory 26 for each of the video cameras 14, may include sub-directories 28 that are divided by time intervals.

The controller 20 is configured to segment each of the plurality of videos received via the input 16 into a plurality of video clips that each correspond to a respective time segment, resulting in a plurality of time ordered video clips for each of the plurality of video cameras 14 including a newest video clip and an oldest video clip. The controller 20 is configured to store each of the plurality of video clips in a corresponding video file on the storage medium 18. The controller 20 is configured to determine when the storage medium 18 reaches a threshold usage capacity. When the storage medium 18 reaches the threshold usage capacity, the controller 20 is configured to identify one or more video files stored in the file system 22 of the storage medium 18 that represent one or more older video clips, and designate the identified one or more video files that represent the one or more older video clips as recycled video files in the file system 22 of the storage medium 18. As subsequent video clips are segmented and added as the newest video clips, the controller 20 is configured to store each of the plurality of newest video clips into a selected one of the recycled video files in the file system 22 of the storage medium 18.

In some cases, identifying one or more video files stored in the file system 22 of the storage medium 18 that represent one or more older video clips may include identifying a video file that represents the oldest video clip, and designating the video file that represents the oldest video clip as a recycled video file in the file system 22 of the storage medium 18. As a subsequent video clip is segmented and added as a subsequent newest video clip, the subsequent newest video clip is stored into the recycled video file in the file system 22 of the storage medium 18. In some cases, identifying one or more video files stored in the file system 22 of the storage medium 18 that represent one or more older video clips may include identifying one or more video files that represents video clips that are older than a predetermined video clip retention policy time period. In some cases, each of the plurality of video cameras of the video surveillance system may be assigned a corresponding video clip retention policy time period. The predetermined video clip retention policy time period for one of the plurality of video cameras may be different from the predetermined video clip retention policy time period for another one of the plurality of video cameras.

In some cases, after designating the identified one or more video files that represent the one or more older video clips as recycled video files, the controller 20 may be configured to move the recycled video files from a video camera directory 26 that corresponds to the respective video camera to the recycled directory 30 in the file system 22 of the storage medium 18. As subsequent video clips are segmented and added as newest video clips from respective ones of the plurality of video cameras 14, for each video camera 14, the controller 20 may be configured to move a selected one of the recycled video files from the recycled directory 30 to the video camera directory 26 that corresponds to the respective video camera 14 and designate the selected recycled video file as a new video file. The controller 20 may be configured to store the newest video clip from the respective video camera 14 into the new video file (i.e. renamed recycled video file) in the respective video camera directory 26.

In some cases, designating the identified one or more video files that represent the one or more older video clips as recycled video files in the file system 22 of the storage medium 18 may include updating a header of each of the identified one or more video files. In some cases, designating the identified one or more video files that represent the one or more older video clips as recycled video files in the file system 22 of the storage medium 18 may include renaming each of the identified one or more video files. In some cases, designating the identified one or more video files that represent the one or more older video clips as recycled video files in the file system 22 of the storage medium 18 may include moving each of the identified one or more video files to the recycled directory 30 in the file system 22 of the storage medium 18.

In some cases, each of the plurality of time ordered video clips may be stored in the hierarchical directory structure 24 in the file system 22 of the storage medium 18, wherein the hierarchical directory structure 24 includes a video camera directory 26 for each of the plurality of video cameras 14 of the video surveillance system 12, and each video camera directory 26 includes one or more sub-directories 28 that each correspond to a period of time, wherein each of the plurality of time ordered video clips is stored in the respective video camera directory 26 that correspond to the video camera 14 that captured the video clip, and in the sub-directory 28 that corresponds to the period of time in which the video clip was captured. In some cases, after designating the identified one or more video files that represent the one or more older video clips as recycled video files, the controller 20 may be configured to move the recycled video files from a video camera directory 26 and sub-directory to a recycled directory 30 in the file system 22 of the storage medium 18.

As subsequent video clips are segmented and added as newest video clips from respective ones of the plurality of video cameras 14, the controller 20 may be configured to move a selected one of the recycled video files from the recycled directory 30 to the video camera directory 26 and sub-directory 28 that corresponds to the respective video camera 14 and the respective period of time and designate the selected recycled video file as a new video file, and to store the newest video clip from the respective video camera 14 into the new video file in the respective video camera directory 26 and sub-directory 28. In some cases, each of the video files may store a video clip that corresponds to a predetermined period of time (e.g. 5 second clip, 1 minute clip, 1 hour clip, 1 day clip, etc.). When so provided, at least for video cameras that have a common bitrate, the one or more video files (and recycled video files) may have a common file size. Thus, the recycled video files need not be resized to store a newest video clip from a respective video camera 14. To accommodate video cameras of different frame rates and/or resolutions, different sized video files and recycled video files may be maintained.

Figure 2A:
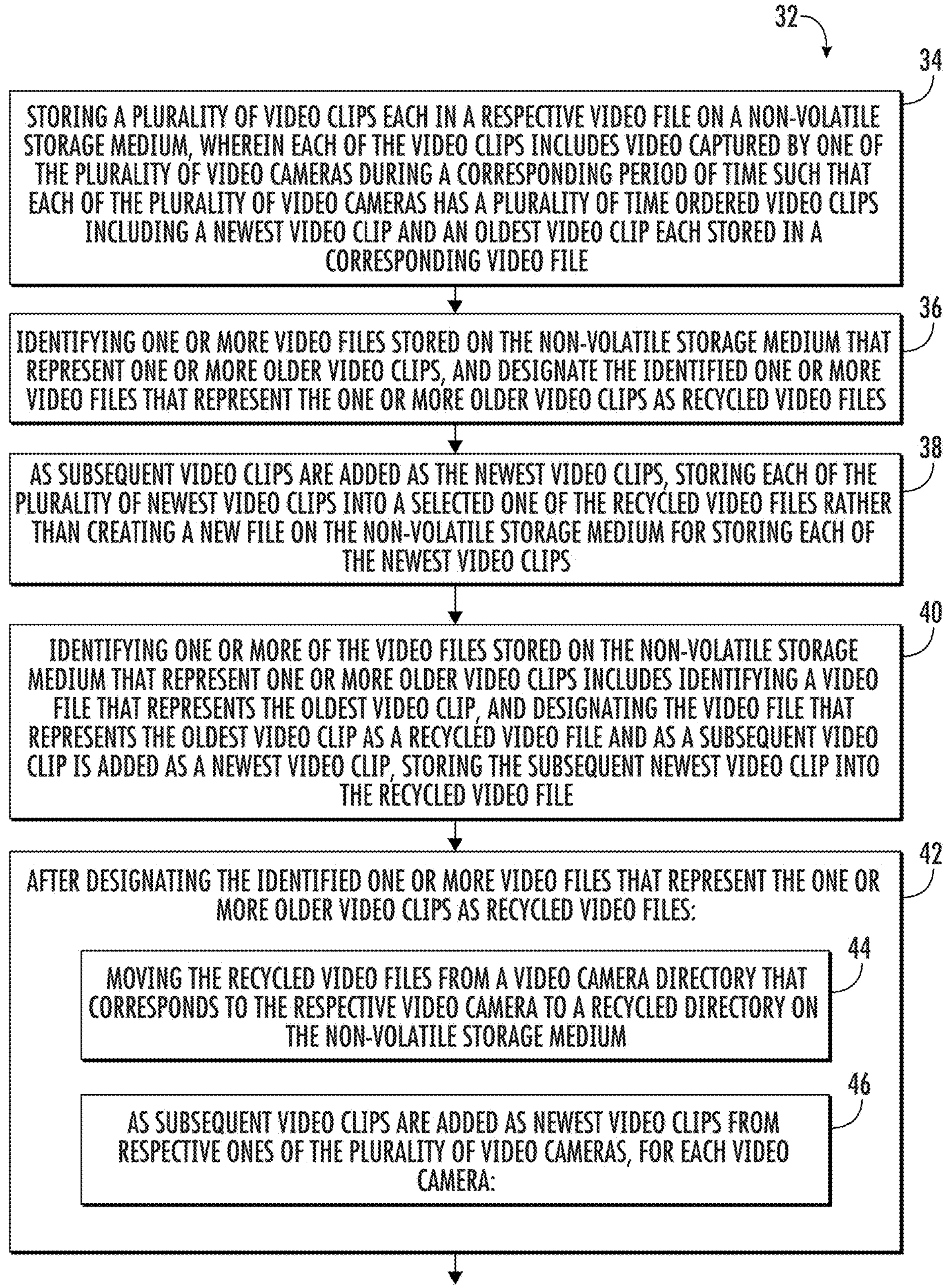
FIGS. 2A and 2B are flow diagrams that together show an illustrative method for storing a plurality of videos.
Figure 2B:
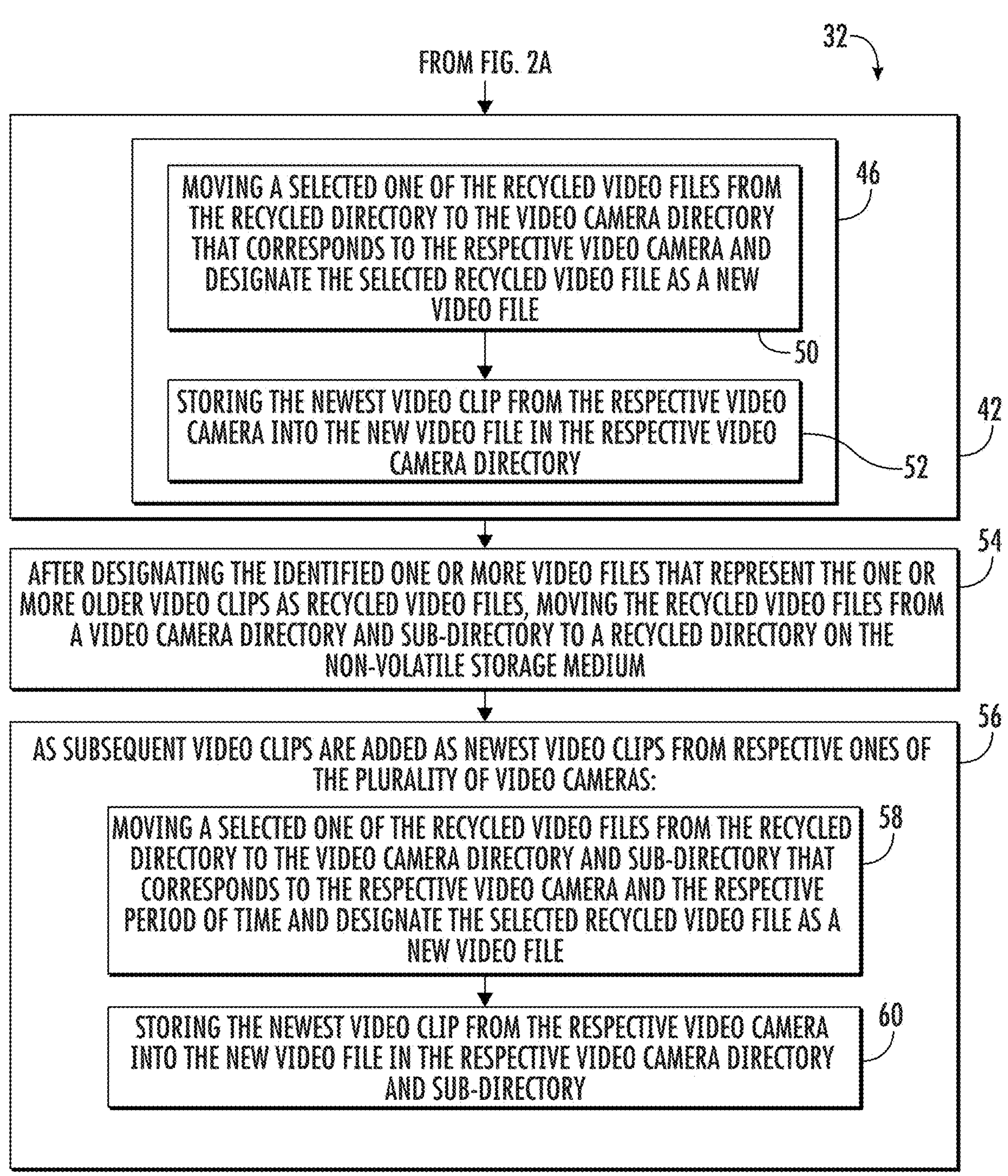

FIGS. 2A and 2B are flow diagrams that together show an illustrative method 32 for storing a plurality of videos each captured by a corresponding one of a plurality of video cameras (such as the video cameras 14) of a video surveillance system (such as the video surveillance system 12). The method 32 includes storing a plurality of video clips each in a respective video file on a non-volatile storage medium, wherein each of the video clips includes video captured by one of the plurality of video cameras during a corresponding period of time such that each of the plurality of video cameras has a plurality of time ordered video clips including a newest video clip and an oldest video clip each stored in a corresponding video file, as indicated at block 34. One or more video files stored on the non-volatile storage medium are identified that represent one or more older video clips, and the identified one or more video files that represent the one or more older video clips are designated (not deleted) as recycled video files, as indicated at block 36. As subsequent video clips are added as the newest video clips, storing each of the plurality of newest video clips are stored into a selected one of the recycled video files rather than creating a new file on the non-volatile storage medium for storing each of the newest video clips, as indicated at block 38.

In some cases, identifying one or more of the video files stored on the non-volatile storage medium that represent one or more older video clips may include identifying a video file that represents the oldest video clip, and designating the video file that represents the oldest video clip as a recycled video file, and as a subsequent video clip is added as a newest video clip, the subsequent newest video clip may be stored into the recycled video file, as indicated at block 40. In some cases, identifying one or more of the video files stored on the non-volatile storage medium that represent one or more older video clips may include identifying one or more video files that represents video clips that are older than a predetermined video clip retention policy time period. In some cases, each of the plurality of video cameras of the video surveillance system may be assigned a corresponding video clip retention policy time period, and the video clip retention policy time period for one of the plurality of video cameras may be different from the video clip retention policy time period for another one of the plurality of video cameras.

In some cases, after designating the identified one or more video files that represent the one or more older video clips as recycled video files, the method 32 may further include additional steps, as indicated at block 42. The additional steps may include moving the recycled video files from a video camera directory that corresponds to the respective video camera to a recycled directory on the non-volatile storage medium, as indicated at block 44. The subsequent steps may include, as subsequent video clips are added as newest video clips from respective ones of the plurality of video cameras, for each video camera, taking additional steps, as indicated at block 46. The additional steps may include moving a selected one of the recycled video files from the recycled directory to the video camera directory that corresponds to the respective video camera and designate the selected recycled video file as a new video file, as indicated at block 50. The additional steps may include storing the newest video clip from the respective video camera into the new video file in the respective video camera directory, as indicated at block 52.

In some cases, designating the identified one or more video files that represent the one or more older video clips as recycled video files may include updating a header of each of the identified one or more video files. Designating the identified one or more video files that represent the one or more older video clips as recycled video files may include renaming each of the identified one or more video files. In some cases, designating the identified one or more video files that represent the one or more older video clips as recycled video files may include moving each of the identified one or more video files to a designated recycle directory. In some cases, each of the plurality of time ordered video clips may be stored in a hierarchical directory structure on the non-volatile storage medium, wherein the hierarchical directory structure includes a video camera directory for each of the plurality of video cameras of the video surveillance system, and each video camera directory includes one or more sub-directories that each correspond to a period of time, wherein each of the plurality of time ordered video clips is stored in the respective video camera directory that correspond to the video camera that captured the video clip, and in the sub-directory that corresponds to the period of time in which the video clip was captured.

In some cases, after designating the identified one or more video files that represent the one or more older video clips as recycled video files, the method 32 may include moving the recycled video files from a video camera directory and sub-directory to a designated recycled directory on the non-volatile storage medium, as indicated at block 54. As subsequent video clips are added as newest video clips from respective ones of the plurality of video cameras, subsequent steps are carried out, as indicated at block 56. The subsequent steps may include moving a selected one of the recycled video files from the recycled directory to the video camera directory and sub-directory that corresponds to the respective video camera and the respective period of time and designate the selected recycled video file as a new video file, as indicated at block 58. The subsequent steps may include storing the newest video clip from the respective video camera into the new video file in the respective video camera directory and sub-directory, as indicated at block 60.

Figure 3:
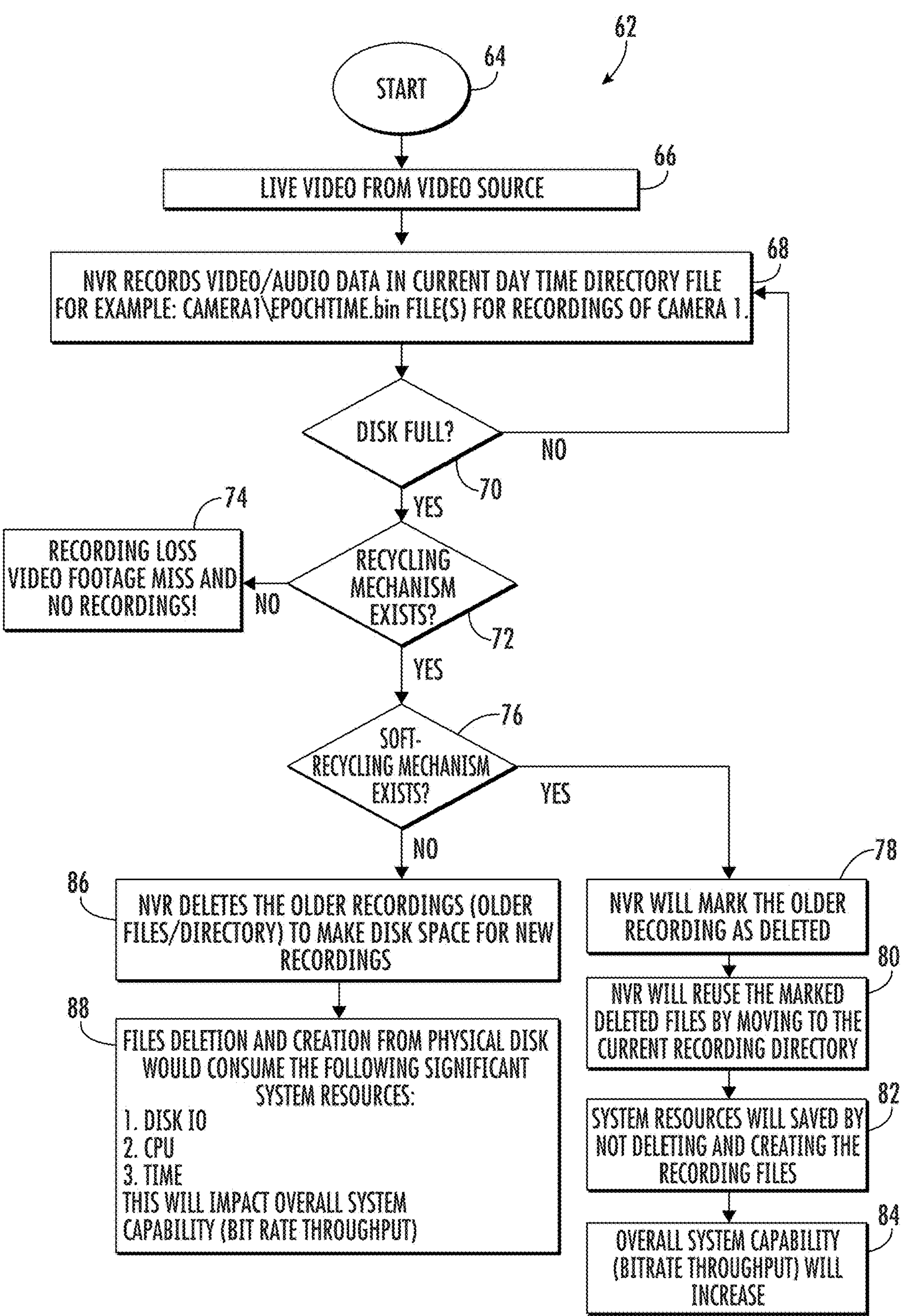
FIG. 3 is a flow diagram showing an illustrative method.

FIG. 3 is a flow diagram showing an illustrative method 62. The method begins at a start block 64. Live video is received, as indicated at block 66. Live Video and audio data is recorded on storage disk(s) of a NVR, as indicated at block 68. A determination is made at decision block 70 as to whether the storage disk(s) is full. If not, control reverts back to block 68. If the storage disk(s) is full, control passes to decision block 72, where a determination is made as to whether a recycling mechanism exists. If not, control passes to block 74, and no recording is completed. If there is a recycling mechanism, control passes to block 78, where an older recording is marked for deletion. The marked deleted files are reused by storing a newest video recording in each of the marked files, as indicated at block 80. This saves system resources, as indicated at block 82. The overall system capability is increased, as indicated at block 84.

Referring back to decision block 76, if no soft recycling mechanism exists, control passes to block 86, and older recording files are deleted to make room for new recording files. As indicated at block 88, this can result in the consumption of significant system resources such as disk IO, CPU usage and time, and the reduction in overall system capability.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A video recording system for archiving a plurality of videos each captured by a corresponding one of a plurality of video cameras of a video surveillance system, the video recording system comprising:

an input for receiving the plurality of videos;

a storage medium for storing files in accordance with a file system;

a controller operatively coupled to the input and the storage medium, the controller configured to:

segment each of the plurality of videos received via the input into a plurality of video clips that each correspond to a respective time segment, resulting in a plurality of time ordered video clips for each of the plurality of video cameras including a newest video clip and an oldest video clip;

store each of the plurality of video clips in a corresponding video file on the storage medium;

determine when the storage medium reaches a threshold usage capacity, and when the storage medium reaches the threshold usage capacity:

identify one or more video files stored in the file system of the storage medium that represent one or more older video clips, and designate the identified one or more video files that represent the one or more older video clips as recycled video files in the file system of the storage medium; and as subsequent video clips are segmented and added as the newest video clips, store each of the plurality of newest video clips into a selected one of the recycled video files in the file system of the storage medium.

2. The video recording system of claim 1, wherein:

identifying one or more video files stored in the file system of the storage medium that represent one or more older video clips comprises identifying a video file that represents the oldest video clip, and designating the video file that represents the oldest video clip as a recycled video file in the file system of the storage medium; and as a subsequent video clip is segmented and added as a subsequent newest video clip, storing the subsequent newest video clip into the recycled video file in the file system of the storage medium.

3. The video recording system of claim 1, wherein:

identifying one or more video files stored in the file system of the storage medium that represent one or more older video clips comprises identifying one or more video files that represents video clips that are older than a predetermined video clip retention policy time period.

4. The video recording system of claim 3, wherein each of the plurality of video cameras of the video surveillance system is assigned a corresponding video clip retention policy time period, wherein the predetermined video clip retention policy time period for one of the plurality of video cameras is different from the predetermined video clip retention policy time period for another one of the plurality of video cameras.

5. The video recording system of claim 1, wherein after designating the identified one or more video files that represent the one or more older video clips as recycled video files, the controller is configured to:

move the recycled video files from a video camera directory that corresponds to the respective video camera to a recycled directory in the file system of the storage medium;

as subsequent video clips are segmented and added as newest video clips from respective ones of the plurality of video cameras, for each video camera:

move a selected one of the recycled video files from the recycled directory to the video camera directory that corresponds to the respective video camera and designate the selected recycled video file as a new video file; and store the newest video clip from the respective video camera into the new video file in the respective video camera directory.

6. The video recording system of claim 1, wherein designating the identified one or more video files that represent the one or more older video clips as recycled video files in the file system of the storage medium comprises updating a header of each of the identified one or more video files.

7. The video recording system of claim 1, wherein designating the identified one or more video files that represent the one or more older video clips as recycled video files in the file system of the storage medium comprises one or more of:

renaming each of the identified one or more video files; and moving each of the identified one or more video files to a recycle directory in the file system of the storage medium.

8. The video recording system of claim 1, wherein each of the plurality of time ordered video clips is stored in a hierarchical directory structure in the file system of the storage medium, wherein the hierarchical directory structure includes a video camera directory for each of the plurality of video cameras of the video surveillance system, and each video camera directory includes one or more sub-directories that each correspond to a period of time, wherein each of the plurality of time ordered video clips is stored in the respective video camera directory that correspond to the video camera that captured the video clip, and in the sub-directory that corresponds to the period of time in which the video clip was captured.

9. The video recording system of claim 8, wherein after designating the identified one or more video files that represent the one or more older video clips as recycled video files, the controller is configured to move the recycled video files from a video camera directory and sub-directory to a recycled directory in the file system of the storage medium.

10. The video recording system of claim 9, wherein as subsequent video clips are segmented and added as newest video clips from respective ones of the plurality of video cameras, the controller is configured to:

move a selected one of the recycled video files from the recycled directory to the video camera directory and sub-directory that corresponds to the respective video camera and the respective period of time and designate the selected recycled video file as a new video file; and store the newest video clip from the respective video camera into the new video file in the respective video camera directory and sub-directory.

11. A method for storing a plurality of videos each captured by a corresponding one of a plurality of video cameras of a video surveillance system, the method comprising:

storing a plurality of video clips each in a respective video file on a non-volatile storage medium, wherein each of the video clips includes video captured by one of the plurality of video cameras during a corresponding period of time such that each of the plurality of video cameras has a plurality of time ordered video clips including a newest video clip and an oldest video clip each stored in a corresponding video file;

identifying one or more video files stored on the non-volatile storage medium that represent one or more older video clips, and designate the identified one or more video files that represent the one or more older video clips as recycled video files; and as subsequent video clips are added as the newest video clips, storing each of the plurality of newest video clips into a selected one of the recycled video files rather than creating a new file on the non-volatile storage medium for storing each of the newest video clips.

12. The method of claim 11, wherein identifying one or more of the video files stored on the non-volatile storage medium that represent one or more older video clips comprises identifying a video file that represents the oldest video clip, and designating the video file that represents the oldest video clip as a recycled video file; and as a subsequent video clip is added as a newest video clip, storing the subsequent newest video clip into the recycled video file.

13. The method of claim 11, wherein identifying one or more of the video files stored on the non-volatile storage medium that represent one or more older video clips comprises identifying one or more video files that represents video clips that are older than a predetermined video clip retention policy time period.

14. The method of claim 13, wherein each of the plurality of video cameras of the video surveillance system is assigned a corresponding video clip retention policy time period, wherein the video clip retention policy time period for one of the plurality of video cameras is different from the video clip retention policy time period for another one of the plurality of video cameras.

15. The method of claim 11, wherein after designating the identified one or more video files that represent the one or more older video clips as recycled video files, the method comprising:

moving the recycled video files from a video camera directory that corresponds to the respective video camera to a recycled directory on the non-volatile storage medium;

as subsequent video clips are added as newest video clips from respective ones of the plurality of video cameras, for each video camera:

moving a selected one of the recycled video files from the recycled directory to the video camera directory that corresponds to the respective video camera and designate the selected recycled video file as a new video file; and storing the newest video clip from the respective video camera into the new video file in the respective video camera directory.

16. The method of claim 11, wherein designating the identified one or more video files that represent the one or more older video clips as recycled video files comprises one or more of:

updating a header of each of the identified one or more video files;

renaming each of the identified one or more video files; and moving each of the identified one or more video files to a recycle directory.

17. The method of claim 11, wherein each of the plurality of time ordered video clips is stored in a hierarchical directory structure on the non-volatile storage medium, wherein the hierarchical directory structure includes a video camera directory for each of the plurality of video cameras of the video surveillance system, and each video camera directory includes one or more sub-directories that each correspond to a period of time, wherein each of the plurality of time ordered video clips is stored in the respective video camera directory that correspond to the video camera that captured the video clip, and in the sub-directory that corresponds to the period of time in which the video clip was captured.

18. The method of claim 17, wherein after designating the identified one or more video files that represent the one or more older video clips as recycled video files, moving the recycled video files from a video camera directory and sub-directory to a recycled directory on the non-volatile storage medium.

19. The method of claim 18, wherein as subsequent video clips are added as newest video clips from respective ones of the plurality of video cameras, the method comprises:

moving a selected one of the recycled video files from the recycled directory to the video camera directory and sub-directory that corresponds to the respective video camera and the respective period of time and designate the selected recycled video file as a new video file; and storing the newest video clip from the respective video camera into the new video file in the respective video camera directory and sub-directory.

20. A non-transitory computer readable medium storing instructions that when executed by one or more processors causes the one or more processors to:

store a plurality of video clips each in a respective video file on a non-volatile storage medium, wherein each of the video clips includes video captured by one of a plurality of video cameras during a corresponding period of time such that each of the plurality of video cameras has a plurality of time ordered video clips including a newest video clip and an oldest video clip each stored in a corresponding video file;

identify one or more video files stored on the non-volatile storage medium that represent one or more older video clips, and designate the identified one or more video files that represent the one or more older video clips as recycled video files; and as subsequent video clips are added as newest video clips, storing each of the plurality of newest video clips into a selected one of the existing recycled video files rather than creating new video files for storing each of the newest video clips.

* * * * *